United States Patent
Guan

(10) Patent No.: US 12,523,765 B2
(45) Date of Patent: Jan. 13, 2026

(54) DRIVER ASSISTANCE SYSTEM AND DEVICE AND METHOD FOR DETERMINING OBJECT STATUS PARAMETER FOR DRIVER ASSISTANCE SYSTEM

(71) Applicant: Robert Bosch GmbH, Stuttgart (DE)

(72) Inventor: Ting Guan, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 437 days.

(21) Appl. No.: 17/988,396

(22) Filed: Nov. 16, 2022

(65) Prior Publication Data
US 2023/0168369 A1 Jun. 1, 2023

(30) Foreign Application Priority Data
Nov. 29, 2021 (CN) .......................... 202111440282.3

(51) Int. Cl.
*G01S 13/931* (2020.01)
*G01S 13/08* (2006.01)
*G01S 13/86* (2006.01)

(52) U.S. Cl.
CPC ............ *G01S 13/931* (2013.01); *G01S 13/08* (2013.01); *G01S 13/867* (2013.01)

(58) Field of Classification Search
CPC ...... G01S 13/931; G01S 13/08; G01S 13/867; G01S 2013/9323; G01S 2013/9324; B60W 40/02; B60W 40/10; B60W 2420/403; B60W 2420/408; B60W 2554/00; B60W 2554/80; B60W 2555/20
See application file for complete search history.

(56) References Cited

U.S. PATENT DOCUMENTS

| | | | | |
|---|---|---|---|---|
| 9,481,365 | B2 * | 11/2016 | Tokoro | B60W 30/0956 |
| 10,124,812 | B2 * | 11/2018 | Ohta | B60W 30/0956 |
| 10,672,275 | B2 * | 6/2020 | Minemura | B60T 7/22 |
| 11,541,888 | B2 * | 1/2023 | Mizuno | G01S 13/867 |
| 2020/0025575 | A1 * | 1/2020 | Weissman | G05D 1/0257 |
| 2021/0387616 | A1 * | 12/2021 | Kobayashi | B60W 30/0953 |

* cited by examiner

*Primary Examiner* — Vladimir Magloire
*Assistant Examiner* — Naomi M Wolford
(74) *Attorney, Agent, or Firm* — Maginot, Moore & Beck LLP

(57) ABSTRACT

A device for determining an object status parameter for a driver assistance system including a radar and a camera arranged on a current vehicle, and the device for determining an object status parameter, includes an acquisition module configured to acquire object information of an object around a current vehicle detected by the radar and the camera, a determining module configured to determine, based on the object information, whether the object is a large object and the object is at the edge of a field of view of the radar, and, detect a precision requirement for a lateral distance between the current vehicle and the object, and a calculation module configured to in a case that it is detected that the precision requirement for the lateral distance is that first precision needs to be satisfied, calculate the lateral distance based on the object information detected by the camera.

9 Claims, 3 Drawing Sheets

DRIVER ASSISTANCE SYSTEM AND DEVICE AND METHOD FOR DETERMINING OBJECT STATUS PARAMETER FOR DRIVER ASSISTANCE SYSTEM

This application claims priority under 35 U.S.C. § 119 to patent application no. CN 202111440282.3, filed on Nov. 29, 2021 in China, the disclosure of which is incorporated herein by reference in its entirety.

The present disclosure relates to a driver assistance system, and also relates to a device and a method for determining an object status parameter for a driver assistance system.

BACKGROUND

An environment sensor is an important component of a driver assistance system, and is configured to assist a driver to perceive an environment around a vehicle. At present, an environment sensor of a driver assistance system mainly includes a radar and a camera, and detection features of the radar and the camera have their own strengths. In the prior art, detection information of both the radar and the camera is usually used to determine a status of an object around a vehicle, that is, the detection information of both the radar and the camera contributes to determining the status of the object around the vehicle.

However, detection performance of the radar and the camera is obviously different in different scenarios. For example, in some cases, the performance of the camera is significantly better than that of the radar, and in some cases, the performance of the radar is significantly better than that of the camera. As a result, if the status of the object is calculated based on the detection information of both the radar and the camera, the calculated status of the object may be imprecise. In view of this, in an existing solution, different proportions of weights are usually allocated to the radar and the camera in different scenarios. However, a weight setting and allocation solution has a problem of difficulty in weight definition, and inappropriate weight setting and allocation may be counterproductive.

SUMMARY

In this context, the present disclosure aims to provide a new technical solution for determining an object status parameter around a vehicle.

According to one aspect of the present disclosure, a device for determining an object status parameter for a driver assistance system is provided, where the driver assistance system includes a radar and a camera arranged on a current vehicle, and the device for determining an object status parameter includes: an acquisition module, configured to acquire object information of an object around a current vehicle detected by the radar and the camera; and a determining module, configured to determine, based on the object information, whether the following is satisfied: the object is a large object and the object is at the edge of a field of view of the radar, and when determining that the above condition is satisfied, detect a precision requirement for a lateral distance between the current vehicle and the object; and a calculation module, configured to: in a case that it is detected that the precision requirement for the lateral distance is that first precision needs to be satisfied, calculate the lateral distance based on the object information detected by the camera.

According to another aspect of the present disclosure, a driver assistance system is provided, including: an environment sensor, including a radar and a camera and configured to detect object information about an object around a current vehicle; and the device for determining an object status parameter as described above, configured to determine whether an object status parameter is calculated based on object information detected by the radar or object information detected by the camera, where the status parameter includes a lateral distance, a lateral relative speed, a longitudinal distance, and a longitudinal relative speed between the current vehicle and the object.

According to still another aspect of the present disclosure, a method for determining an object status parameter for a driver assistance system is provided, optionally executed by the above-mentioned device and/or the above-mentioned system, where the method includes: acquiring object information of an object around a current vehicle detected by a radar and a camera arranged on a current vehicle; determining, based on the object information, whether the following is satisfied: the object is a large object and the object is at the edge of a field of view of the radar; when determining that the above condition is satisfied, detecting a precision requirement for a lateral distance between the current vehicle and the object; and in a case that it is detected that the precision requirement for the lateral distance is that first precision needs to be satisfied, calculating the lateral distance based on the object information detected by the camera.

According to yet another aspect of the present disclosure, a machine-readable storage medium is provided, where the machine-readable storage medium stores executable instructions, and the instructions, when executed, cause one or more processors to perform the method as described above.

A summary of main aspects of the present disclosure is provided above, in order to facilitate a basic understanding of these aspects. The summary is neither intended to describe key or important elements of all aspects of the present disclosure, nor to limit the scope of any or all of the aspects of the present disclosure. The summary is intended to provide some implementations of these aspects in a simplified way, as a preface to the detailed description to be provided below.

DETAILED DESCRIPTION

Embodiments of the present disclosure relate to a technical solution for determining an object status parameter around a vehicle, and are applied to a driver assistance system including a vehicle-mounted radar and a vehicle-mounted camera. According to the technical solution of the embodiments of the present disclosure, when both sensors of the radar and the camera can detect the object, it is determined, according to a determining result of a designed condition, whether the object status parameter is calculated based on object information detected by the radar or object information detected by the camera. The status parameter includes a lateral distance, a lateral relative speed, a longitudinal distance, and a longitudinal relative speed between the current vehicle and the object.

According to the technical solution of the embodiments of the present disclosure, it is determined, according to a current status of the detected object and an attribute of the object, that the object status parameter is calculated based on the object information detected by either of the sensor of the radar and the sensor of the camera. This solution makes full use of detection advantages of the radar and the camera, and does not have the problem of how to allocate weights to the radar and the camera.

Hereinafter, embodiments of the present disclosure will be described with reference to the accompanying drawings.

Figure 1:
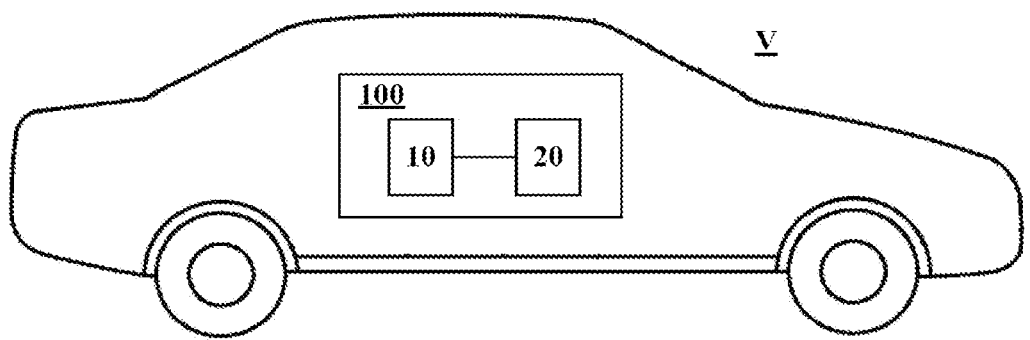
FIG. 1 is a schematic diagram of a driver assistance system according to an embodiment of the present disclosure.

FIG. 1 illustratively shows a driver assistance system 100 according to an embodiment of the present disclosure. The driver assistance system is arranged on a vehicle V (a current vehicle) and includes an environment sensor 10 and a device 20 for determining an object status parameter. The environment sensor 10 is configured to detect (capture) object information of an object around the vehicle V. The device 20 for determining an object status parameter is configured to determine a status parameter of the detected object. The object status parameter can facilitate driver assistance. For example, when the vehicle V is in an autonomous driving mode, after an accurate object status parameter is known, a precise autonomous driving strategy can be obtained. When the vehicle V is driven by a human driver, an in-vehicle display displays the accurate object status parameter to the driver, and the driver can perform an appropriate driving behavior in time.

Figure 2:
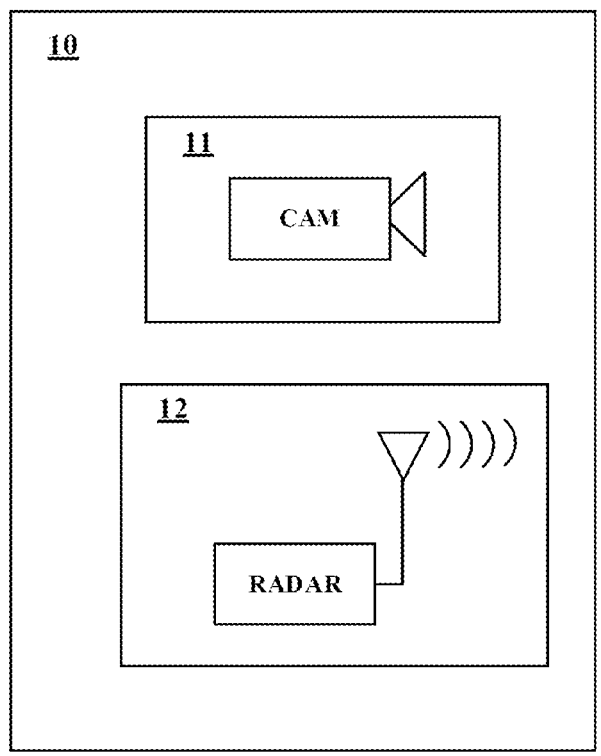
FIG. 2 is a schematic diagram of an environment sensor of the driver assistance system in FIG. 1 according to an embodiment of the present disclosure.

FIG. 2 illustratively shows an environment sensor 10 according to an embodiment of the present disclosure. As shown in FIG. 2, the environment sensor 10 may include a camera 11 and a radar 12. The camera 11 may include one or more cameras, and the cameras are respectively arranged at suitable positions on the vehicle V, for example, the top of the vehicle V or around the body of the vehicle. The camera 11 may include one or more of a single-target camera, a multi-target camera, and a surround-view camera, and each type of camera may include one or more cameras. The radar 12 may include one or more radars, and the radars are respectively arranged at suitable positions on the vehicle V, for example, the front or rear of the vehicle V or around the body of the vehicle. The radar 12 may include one or more of a laser radar, an ultrasonic radar, and a millimeter wave radar, and each type of radar may include one or more radars.

Figure 3:
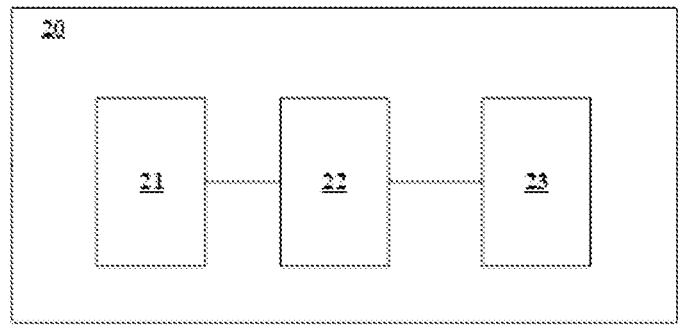
FIG. 3 is a schematic diagram of a device for determining an object status parameter for the driver assistance system in FIG. 1 according to an embodiment of the present disclosure.

FIG. 3 illustratively shows a device 20 for determining an object status parameter according to an embodiment of the present disclosure. The device acquires information detected by the environment sensor 10, analyzes and processes the information, and determines a status parameter of a detected object.

The device 20 for determining an object status parameter may be implemented in a manner of hardware or software or a combination of software and hardware. Implementation through hardware may be implementation in one or more application-specific integrated circuits (ASIC), digital signal processors (DSP), programmable logic devices (PLD), field-programmable gate arrays (FPGA), processors, controllers, microcontrollers, microprocessors, electronic units designed to perform functions thereof, or a combination thereof. Implementation through software may be implementation by means of microcode, program code, or code segments, which can also be stored in a machine-readable storage medium such as a storage component.

Referring to FIG. 3, in an embodiment, the device 20 for determining an object status parameter may include an acquisition module 21, a determining module 22, and a calculation module 23. These modules are, for example, software modules. The naming of each module should be understood as a logical (functional) description, and should not be understood as a limitation of a physical form or an arrangement. For example, one or more of the acquisition module 21, the determining module 22, and the calculation module 23 may be implemented in a same chip or circuit, or may be provided in different chips or circuits. One or more of these modules may be further divided into several sub-modules according to functions.

Figure 4:
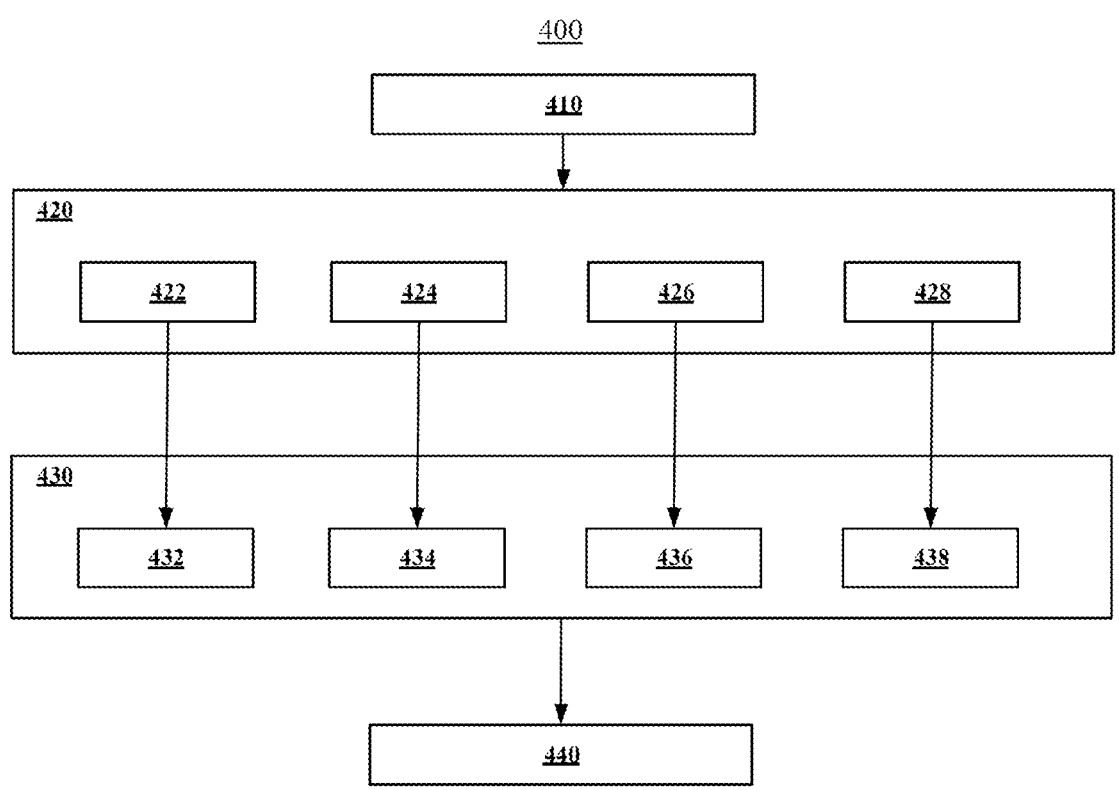
FIG. 4 is a schematic diagram of a process for determining an object status parameter according to an embodiment of the present disclosure.

FIG. 4 illustratively shows a process 400 for determining an object status parameter according to an embodiment of the present disclosure. The process 400 can be implemented by the system 100 or the device 20 described above. Therefore, the above descriptions about the system 100 and the device 20 are also applicable herein. When both sensors of the camera 11 and the radar 12 can detect the object, the process 400 may be used to determine whether it is appropriate to calculate the object status parameter based on the information detected by the camera or the information detected by the radar.

The "object" in the present disclosure can be understood as a target object around a current vehicle. The determining in the present disclosure is applicable to the same object detected by both the radar and the camera. A method for determining whether objects detected by the camera and the radar are a same object can be implemented in various manners, for example, implemented by matching various attribute parameters of the objects. A specific determining method is not limited in the present disclosure.

An "object" may include a movable object (for example, a person, a vehicle, or an animal) and an immovable object (for example, an immovable obstacle). A movable object may be stationary, and a location of an immovable object may also be changed. For example, a vehicle is parked on a road, or a location of a dumpster is moved. An "object" may include one or more objects detected by a vehicle-mounted sensor. When multiple objects are detected, a status parameter of each object may be determined according to the process 400.

Referring to FIG. 4, in block 410, the acquisition module 21 acquires object information detected by the camera 11 and the radar 12.

In block 420, the determining module 22 analyzes and processes the acquired object information, so as to perform determining on determining conditions of four aspects of the lateral distance, the lateral relative speed, the longitudinal distance, and the longitudinal relative speed between the current vehicle and the object respectively.

In block 430, the calculation module 23 calculates object status parameters of the aspects based on a determining result of the determining module 22, that is, determines, based on determining results of the aspects, whether the status parameters of the aspects (the lateral distance, the lateral relative speed, the longitudinal distance, and the longitudinal relative speed between the current vehicle and the object) are calculated based on the object information detected by the radar or the object information detected by the camera.

In block 440, the calculation module 23 outputs the calculated object status parameters. For example, the object status parameters are output to functional modules such as forward collision warning and rear cross traffic warning of the driver assistance system 100 of the current vehicle, so that these driver assistance functional modules can make corresponding decisions based on the object status parameters.

It can be understood that, one or more of the parameter calculation processes (update process) of the four aspects may be selectively performed. In other words, according to this embodiment of the present disclosure, only one, two, or three of the four aspects of the object status parameters may be updated, instead of updating all the four aspects. Next, still referring to FIG. 4, processes for determining object status parameters of the four aspects of the lateral distance, the lateral relative speed, the longitudinal distance, and the longitudinal relative speed are described. The embodiments described below are all implemented when both the camera and the radar can detect objects and the camera sensor and the radar sensor detect a same object.

About the Lateral Distance Between the Current Vehicle and the Object

When a target object is a large traffic participant and is not too far from a longitudinal position of the current vehicle (for example, within 20 meters), dense point cloud (that is, dense reflection points) is obtained after radar scanning, and a lateral distance between the current vehicle and the object (or a lateral location of the object) calculated based on the dense point cloud jumps. In this case, it is very inaccurate to calculate the lateral distance between the current vehicle and the object (or the lateral location of the object) based on the object information detected by the radar sensor. Therefore, in this case, it is appropriate to calculate the lateral distance between the current vehicle and the object (or the lateral location of the object) based on the object information detected by the camera.

In an embodiment, in block 422, the determining module 22 performs determining on the lateral distance between the current vehicle and the object. Besides, in block 432, the calculation module 23 calculates the lateral distance between the current vehicle and the object based on a determining result.

The determining module 22 determines whether the following condition (1) and condition (2) are satisfied.

(1) Whether the object is a large object. For example, a set including multiple large objects (for example, lorries and large trucks etc.) is predetermined according to object types and is stored in a memory (not shown) of the driver assistance system 100. The determining module 22 identifies an image or a video captured by the camera, to identify an object type. Matching between the identified object type and types of objects in the set is performed one by one, and if the identified object type successfully matches with a type of an object in the set, it is determined that the object is a large object. When the identified object type matches with none of object types in the set, it is determined that the object is not a large object.

In addition, it may be determined whether the object is a large object by determining whether a length, a width, and a height of the object are greater than predetermined length, width, and height thresholds. For example, the length, the width, and the height of the identified object are compared with predetermined length, width, and height thresholds, and the length, width, and height thresholds may be determined based on values of a length, a width, and a height of the large object. When the length of the identified object is greater than the predetermined length threshold, the width of the identified object is greater than the predetermined width threshold, and the height of the identified object is greater than the predetermined height threshold, it is determined that the object is a large object. When at least one of the length, width, and height of the object is less than the corresponding threshold, it is determined that the object is not a large object.

(2) Whether the object is at the edge of a field of view of the radar sensor. For example, the location of the object is determined based on an image or a video captured by the camera, and it is determined whether the location of the object is at the edge of the field of view (FoV) of the radar sensor. The radar sensor is very imprecise in detecting an object at the edge of the field of view of the radar sensor. Therefore, if the object is located at the edge of the field of view of the radar sensor, it is unsuitable to use the object information detected by the radar sensor.

When it is determined that both the condition (1) and the condition (2) are satisfied, that is, it is determined that the object is a large object and is at the edge of the field of view of the radar, the precision requirement for the lateral distance between the current vehicle and the object is further detected.

The precision requirement may be a requirement output by a user of the current vehicle on a human-computer interaction interface in the vehicle. In this embodiment of the present disclosure, two levels of precision are included: first precision and second precision higher than the first precision. The first precision is precision that can satisfy most application scenarios. The second precision is higher precision than the first precision, that is, can satisfy scenarios with higher precision requirements. It can be understood that the use of the first precision and the second precision herein is to clearly describe the two levels of precision requirements, and is not intended to limit a specific precision value or precision range.

In a case that a detection result is that the precision requirement for the lateral distance is that first precision needs to be satisfied, the calculation module 23 calculates the lateral distance (or a lateral location of the object) based on the object information detected by the camera.

When the detection result is that the precision requirement for the lateral distance is that the second precision higher than the first precision needs to be satisfied, the determining module 22 further determines whether the following condition (3) and condition (4) are satisfied.

(3) A number of radar reflection points is greater than a predetermined number threshold (for example, the number threshold is 10). The number threshold may be calculated based on experience and/or models.

(4) Whether a difference between average reflected energy of multiple radar reflection points and maximum or minimum reflected energy is less than a predetermined energy difference threshold. The energy difference threshold may be calculated based on experience and/or models.

In determining on the above condition (3) and condition (4), it can be understood that if the number of radar reflection points is large and the reflected energy of these radar reflection points is basically the same (for example, the reflected energy is all energy of the same magnitude), it can be considered that the radar reflection points are reflection points for a same large object. On this basis, it may be further determined that the object is a large object.

If it is determined that the above condition (3) and condition (4) are satisfied, the calculation module 23 performs calculation of the lateral distance (that is, calculates the lateral distance or the lateral location of the object based on the object information detected by the camera). If it is determined that the above condition (3) and condition (4) are not satisfied, the calculation module does not perform calculation of the lateral distance.

About the Lateral Relative Speed Between the Current Vehicle and the Object

When the object is a small object, for example, a small traffic participant and is near the center line in a width direction of the current vehicle (for example, the object is in the center location in front of or behind the current vehicle), and a lateral moving speed of the object is slow (an example of this scenario is that a pedestrian is in the center location in front of the current vehicle and is crossing a road slowly), it is very inaccurate to calculate the lateral relative speed between the current vehicle and the object based on the object information detected by the radar sensor. Therefore, in this case, it is appropriate to calculate the lateral relative speed between the current vehicle and the object based on the object information detected by the camera.

In an embodiment, in block 424, the determining module 22 performs determining on the lateral relative speed between the current vehicle and the object. Besides, in block 434, the calculation module 23 calculates the lateral relative speed between the current vehicle and the object based on a determining result.

The determining module 22 determines whether the following condition (1) and condition (2) are satisfied.

(1) Whether the object is a small object. For example, a set including multiple small objects (for example, vulnerable traffic participants such as pedestrians, pets, and bicycles) is predetermined according to object types and is stored in a memory (not shown) of the driver assistance system 100. The determining module 22 identifies an image or a video captured by the camera, to identify an object type. Matching between the identified object type and types of objects in the set is performed one by one, and if the identified object type successfully matches with a type of an object in the set, it is determined that the object is a small object. When the identified object type matches with none of object types in the set, it is determined that the object is not a small object.

In addition, it may be determined whether the object is a small object by determining whether a length, a width, and a height of the object are less than predetermined length, width, and height thresholds. For example, the length, the width, and the height of the identified object are compared with predetermined length, width, and height thresholds, and the length, width, and height thresholds may be determined based on values of a length, a width, and a height of the small object. When the length of the identified object is less than the predetermined length threshold, the width of the identified object is less than the predetermined width threshold, and the height of the identified object is less than the predetermined height threshold, it is determined that the object is a small object. When at least one of the length, width, and height of the object is greater than the corresponding threshold, it is determined that the object is not a small object.

(2) Whether an azimuth angle between the object and the current vehicle is less than a predetermined angle threshold. The azimuth angle between the object and the current vehicle may be defined in the following two manners: (a) an angle between a line connecting the object to the radar sensor and the center line in the width direction of the current vehicle; and (b) am angle $\theta=\arctan(dy/dx)$ obtained based on the lateral relative distance and the longitudinal relative distance between the object and the current vehicle. The angle threshold may be a very small angle, for example, close to 0°.

When it is determined that both the above condition (1) and condition (2) are satisfied, that is, it is determined that the object is a small object and the azimuth angle between the object and the current vehicle is less than a predetermined angle threshold, the precision requirement for the lateral relative speed between the current vehicle and the object is further detected.

In a case that a detection result is that the precision requirement for the lateral relative speed is that first precision needs to be satisfied, the calculation module 23 calculates the lateral relative speed based on the object information detected by the camera.

When the detection result is that the precision requirement for the lateral relative speed is that the second precision higher than the first precision needs to be satisfied, the determining module 22 further determines whether the following condition (3) are satisfied.

(3) The determining module 22 determines, based on the object information detected by the camera, whether the lateral moving speed of the object is less than a predetermined lateral speed threshold. The lateral speed threshold may be calculated based on experience and/or models. For a small object, there are fewer radar reflection points. If the small object is slowly moving laterally, it is very difficult to accurately detect a lateral speed of the object according to a lateral speed detection resolution of the radar. In this case, it is suitable to calculate the lateral moving speed of the object based on the information detected by the camera.

If it is determined that the above condition (3) is satisfied, the calculation module 23 performs calculation of the lateral relative speed (that is, the calculation module 23 calculates the lateral relative speed based on the object information detected by the camera). If it is determined that the condition (3) is not satisfied, the calculation module 23 does not perform calculation of the lateral relative speed.

About the Longitudinal Distance Between the Current Vehicle and the Object

If a maximum longitudinal detection distance of the radar is larger than that of the camera, when the object can be detected by the camera and is near the edge of a longitudinal detection range of the camera, it is very inaccurate to calculate the longitudinal distance between the current vehicle and the object based on the object information detected by the camera. In this case, it is suitable to calculate the longitudinal distance based on the object information detected by the radar. For example, the maximum longitudinal detection distance of the radar is 200 meters, and the maximum longitudinal detection distance of the camera is 80 meters. When the longitudinal distance between the object and the current vehicle is about 60 meters, it is suitable to calculate the longitudinal distance based on the information detected the radar, instead of the object information detected by the camera.

In an embodiment, in block 426, the determining module 22 determines whether the following condition (1) and condition (2) are satisfied. Besides, in block 436, the calculation module 23 calculates the longitudinal distance between the current vehicle and the object based on a determining result.

(1) Whether a longitudinal distance between the object and the current vehicle is between 80% and 100% of a maximum longitudinal detection distance of the camera 11.

(2) For a same object detected by the camera 11 and the radar 12, whether a difference between longitudinal distances between the object and the current vehicle respectively acquired based on information detected by the camera and the radar is greater than a distance difference threshold.

Setting of the above condition (1) and condition (2) can be understood as: When the longitudinal distance between the object and the current vehicle is between 80% and 100% of the maximum longitudinal detection distance of the camera 11, for the object, if the longitudinal distance calculated based on the information detected by the radar is greatly different from the longitudinal distance calculated based on the information detected by the camera, a result calculated based on the information detected by the radar is used.

When it is determined that both the above condition (1) and condition (2) are satisfied, the calculation module 23 calculates the longitudinal distance between the object and the current vehicle based on the object information detected by the radar.

About the Longitudinal Relative Speed Between the Current Vehicle and the Object If the object is a moving vehicle and the moving vehicle is at the edge of the field of view of the radar and is close to the current vehicle (that is, at a position that is of the edge of the field of view of the radar and that is close to the current vehicle), it is highly probable that a location scanned by the radar is on the wheels of the moving vehicle instead of the body of the vehicle. In this case, it is highly probable that the longitudinal speed calculated based on the information detected by the radar is a rotation speed of the wheels of the moving vehicle rather than the longitudinal speed of the object. Therefore, in this case, it is appropriate to calculate the longitudinal speed of the object based on the information detected by the camera.

In an embodiment, in block 428, the determining module 22 determines whether the following condition (1) to condition (3) are satisfied. Besides, in block 438, the calculation module 23 calculates the longitudinal relative speed between the current vehicle and the object based on a determining result.

(1) Whether the object is at the edge of a field of view of the radar sensor.

(2) Whether a straight-line distance between the object and the current vehicle is less than a predetermined distance threshold. The distance threshold may be calculated based on experience and/or models.

(3) Whether a difference between an average longitudinal speed and a maximum longitudinal speed that are acquired based on multiple radar reflection points is greater than a predetermined speed difference threshold. The speed difference threshold may be calculated based on experience and/or models.

The above condition (1) to condition (3) can be understood as: If the object is located at a position that is of the edge of the field of view of the radar sensor and that is close to the current vehicle, and longitudinal moving speeds of the object respectively acquired based on the multiple radar reflection points include a speed significantly higher than the other speeds, it is highly probable that what is detected by the radar is not the longitudinal speed of the object. Therefore, the information detected by the radar is not used.

When it is determined that the above condition (1) to condition (3) are all satisfied, the calculation module 23 calculates the longitudinal relative speed between the object and the current vehicle based on the object information detected by the camera.

Figure 5:
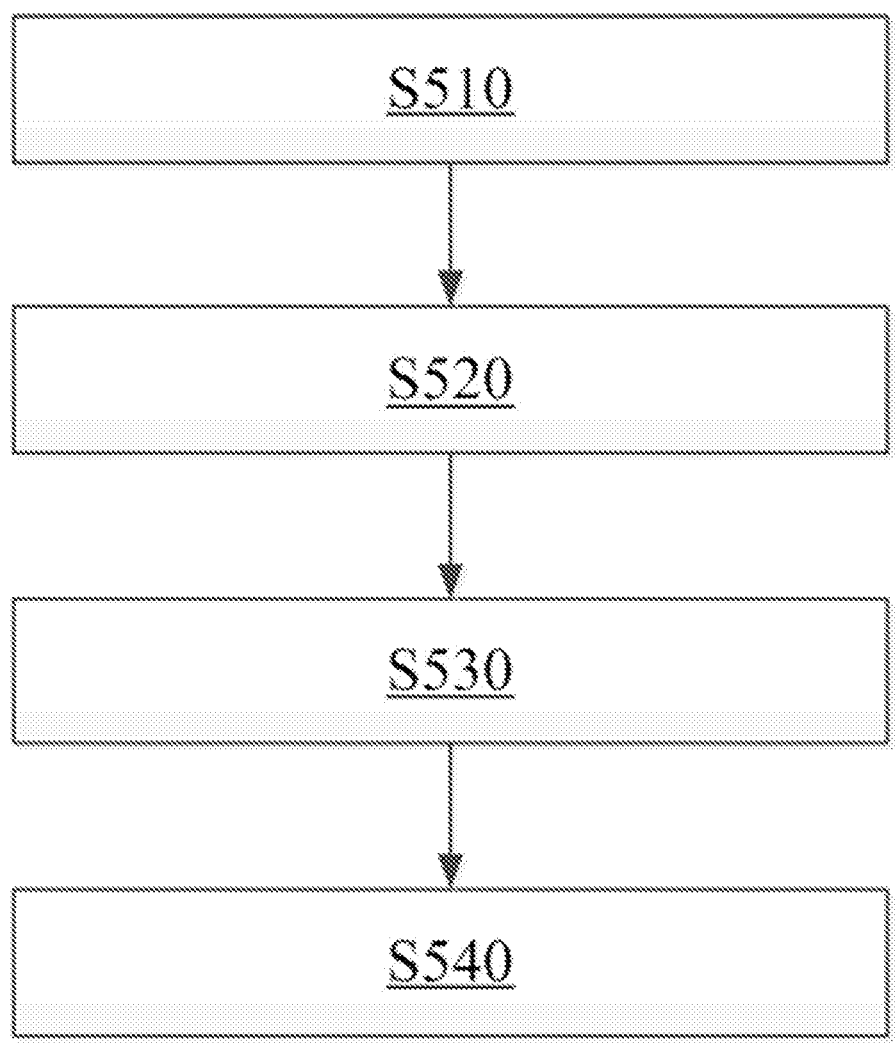
FIG. 5 is a flowchart of a method for determining an object status parameter for a driver assistance system according to an embodiment of the present disclosure.

FIG. 5 illustratively shows a method 500 for determining an object status parameter for a driver assistance system according to an embodiment of the present disclosure. The method 500 may be performed by the device 20 and/or the system 100 as described above. Therefore, the above related descriptions are also applicable herein.

Refer to the figure. Step S510: Acquire object information of an object around a current vehicle detected by a radar and a camera arranged on a current vehicle.

Step S520: Determine, based on the object information, whether the following is satisfied: the object is a large object and the object is at the edge of a field of view of the radar.

Step S530: When determining that the above condition is satisfied, detect a precision requirement for a lateral distance between the current vehicle and the object. When it is determined that the above condition is not satisfied, the current update of the lateral distance ends.

Step S540: In a case that it is detected that the precision requirement for the lateral distance is that first precision needs to be satisfied, calculate the lateral distance based on the object information detected by the camera.

The present disclosure further provides a machine-readable storage medium, where the machine-readable storage medium stores executable instructions, and the instructions, when executed, cause one or more processors to perform the method 500 described above.

It can be understood that all the modules described above may be implemented in various ways. These modules may be implemented as hardware, software, or a combination thereof. In addition, any of these modules can be further divided into sub-modules or combined together in terms of function.

It can be understood that the processor may be implemented using electronic hardware, computer software, or any combination thereof. Whether these processors are implemented as hardware or software may depend on a specific application and overall design constraints imposed on the system. As an example, the processor, any part of the processor, or any combination of processors provided in the present disclosure can be implemented as a microprocessor, a microcontroller, a digital signal processor (DSP), a field programmable gate array (FPGA), a programmable logic device (PLD), a status machine, a gate logic, a discrete hardware circuit, and other suitable processing components configured to perform the various functions described in the present disclosure. Functions of the processors, any part of the processors, or any combination of the processors provided in the present disclosure can be implemented as software executed by a microprocessor, a microcontroller, a DSP, or other suitable platforms.

It can be understood that the software should be broadly regarded as representing instructions, instruction sets, codes, code segments, program codes, programs, subprograms, software modules, applications, software applications, software packages, routines, subroutines, objects, running threads, processes, functions, etc. The software can reside in a computer-readable medium. The computer-readable medium may include, for example, a memory, and the memory may be, for example, a magnetic storage device (such as a hard disk, a floppy disk, and a magnetic stripe), a compact disk, a smart card, a flash memory device, a random access memory (RAM), a read-only memory (ROM), a programmable ROM (PROM), an erasable PROM (EPROM), an electrically erasable PROM (EEPROM), a register or a removable disk. Although the memory is shown to be separate from the processor in the various aspects presented in the present disclosure, the memory (such as a cache or a register) may also be located inside the processor.

Although some implementations have been described above, these implementations are presented only as examples and are not intended to limit the scope of the present disclosure. The disclosure and equivalent replacements thereof are intended to cover all modifications, substitutions and changes made within the scope and subject matter of the present disclosure.

What is claimed is:

1. A device for determining an object status parameter for a driver assistance system including a radar and a camera arranged on a vehicle, the device comprising:
   a processor configured to:
      acquire object information of an object around the vehicle, detected by the radar and the camera;
      determine, based on the acquired object information, whether a first condition is met, the first condition being that (i) the object has a first object size classification and (ii) the object is within a threshold distance from an edge of a field of view of the radar;
      in response to determining that the first condition is met:
         determine a precision requirement for a lateral distance between the vehicle and the object; and
         calculate, in response to determining that a first distance precision is required, the lateral distance based on the object information detected by the camera;
         determine, in response to determining that a second distance precision is required, the second distance precision being higher than the first distance precision, whether a second condition, the second condition being that (i) a number of radar reflection points is greater than a number threshold, and (ii) a difference between average reflected energy of multiple radar reflection points and maximum or minimum reflected energy is less than an energy difference threshold is met; and
         calculate, in response to determining that the second condition is met, the lateral distance based on the object information detected by the camera, wherein the processor is further configured to not execute the calculation of the lateral distance when the second distance precision is required and the second condition is not met.

2. The device for determining the object status parameter according to claim 1, wherein the processor is further configured to:
   determine, based on the object information, whether a third condition is met, the third condition being that (i) the object has a second object size classification and (ii) an azimuth angle of the object relative to the vehicle is less than an angle threshold, and
   in response to determining that the third condition is met:
      determine a precision requirement for a lateral relative speed between the vehicle and the object; and
      calculate the lateral relative speed based on the object information detected by the camera in response to the detected precision requirement for the lateral relative speed being a first speed precision.

3. The device for determining the object status parameter according to claim 2, wherein the processor is further configured to, in response to determining that the third condition is met:
   determine, in response to determining that second speed precision is required, the second speed precision being higher than the first speed precision, whether a fourth condition is met, the fourth condition being that a lateral moving speed of the object is less than a lateral speed threshold; and
   execute calculation of the lateral relative speed in response to determining that the fourth condition is met, wherein the processor is further configured to not execute the calculation of the lateral relative speed when the condition is not met.

4. The device for determining the object status parameter according to claim 1, wherein the processor is further configured to:
   determine, based on the acquired object information, whether a fifth condition is met, the fifth condition being that (i) a longitudinal distance between the object and the vehicle is between 80% and 100% of a maximum longitudinal detection distance of the camera, and (ii) a difference between a longitudinal distance calculated based on the object information detected by the camera and a longitudinal distance calculated based on the object information detected by the radar is greater than a distance difference threshold; and
   calculate the longitudinal distance based on the object information detected by the radar in response to determining that the fifth condition is met.

5. The device for determining the object status parameter according to claim 1, wherein the processor is further configured to:
   determine, based on the object information, whether a sixth condition is met, the sixth condition being that (i) the object is within the threshold distance from the edge of the field of view of the radar, (ii) a straight-line distance between the object and the vehicle is less than a distance threshold, and (iii) a difference between an average longitudinal moving speed of the object and a maximum longitudinal moving speed of the object that are acquired based on multiple radar reflection points is greater than a speed difference threshold; and
   calculate a longitudinal relative speed based on the object information detected by the camera in response to determining that the sixth condition is met.

6. The device according to claim 1, wherein the device for determining the object status parameter is arranged in an electronic control unit of the vehicle.

7. A driver assistance system, comprising:
   an environment sensor, comprising a radar and a camera, configured to detect object information about an object around a vehicle; and
   the device for determining the object status parameter according to claim 1, wherein the device for determining the object status parameter is further configured to determine whether the object status parameter is calculated based on object information detected by the radar or object information detected by the camera, wherein the status parameter comprises a lateral distance, a lateral relative speed, a longitudinal distance, and a longitudinal relative speed between the vehicle and the object.

8. A method for determining an object status parameter for a driver assistance system, comprising:
   acquiring object information of an object around a vehicle detected by a radar and a camera arranged on the vehicle;
   determining, based on the object information, whether a first condition is met (i) the object has a first object size classification and (ii) the object is within a threshold distance from an edge of a field of view of the radar is met;

in response to determining that the first condition is met:

determining a precision requirement for a lateral distance between the vehicle and the object; and calculating, in response to determining that a first distance precision is required, the lateral distance based on the object information detected by the camera;

determining, in response to determining that a second distance precision is required, the second distance precision being higher than the first distance precision, whether a second condition, the second condition being that (i) a number of radar reflection points is greater than a number threshold, and (ii) a difference between average reflected energy of multiple radar reflection points and maximum or minimum reflected energy is less than an energy difference threshold is met; and calculating, in response to determining that the second condition is met, the lateral distance based on the object information detected by the camera, wherein the calculation of the lateral distance is not executed when the second distance precision is required and the second condition is not met.

9. The method of claim 8, wherein the method is performed by one or more processors executing executable instructions stored on a non-transitory machine-readable storage medium.

\* \* \* \* \*